United States Patent Office 3,427,531
Patented Feb. 11, 1969

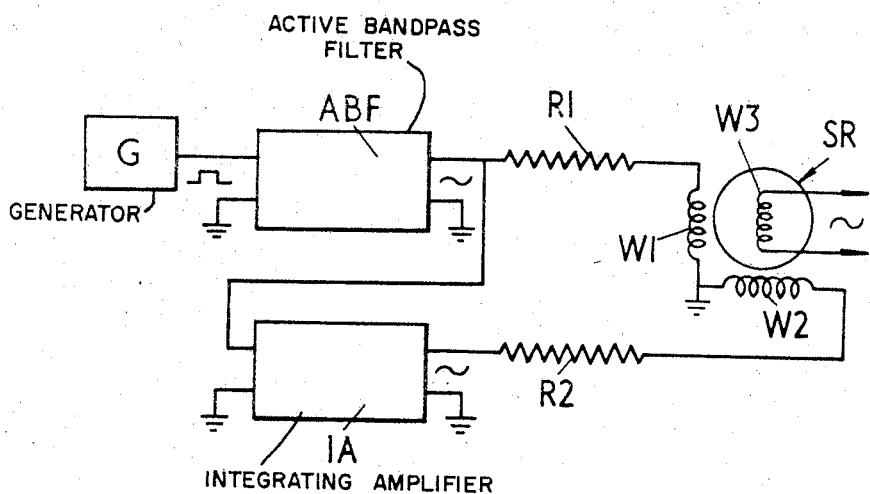

3,427,531
SUPPLY CIRCUIT FOR SYNCHRO RESOLVERS
Edward James Parrott, Kent, England, assignor to
Muirhead & Co. Limited, Kent, England
Filed Nov. 28, 1966, Ser. No. 597,382
Claims priority, application Great Britain, Jan. 18, 1966,
2,365/66
U.S. Cl. 323—108            1 Claim
Int. Cl. H03h 1/00

This invention relates to supply circuits for synchro resolvers including magslip resolvers, phase shifters and the like.

Synchro resolvers require to be fed with two supplies of exact phase quadrature in various applications.

Different methods of providing an accurately phased 2-phase supply are known; for example, the use of a Scott connected transformer whereby a 2-phase output may be derived from a 3-phase input.

By means of a delta network of resistors and capacitors a 2-phase output may be derived from a single phase supply.

Similarly, a 2-phase supply may be derived from a simple RC phase splitting network. All of these methods however are subject to phase errors due to changes in temperature, frequency of loading.

In some applications it may be necessary to provide a sinusoidal 2-phase supply of which the two outputs are essentially pure sine waves of equal magnitude and the phase displacement between them is 90° to a high order of accuracy, these parameters being sensibly unaffected by changes in temperature and frequency drift.

In one aspect the present invention consists in a supply circuit for a synchro resolver in which a single phase square wave input is fed to an active bandpass filter the output of which is fed to one winding of the synchro resolver over a resistance and the output of the active bandpass filter also feeds an integrating amplifier which supplies the other input winding of the synchro resolver over a resistance.

The active bandpass filter is a known kind having high second harmonic rejection, low temperature/phase characteristics and low output impedance.

The integrating amplifier is a known kind the features of which are unity gain, low phase/temperature characteristic, high input impedance and low output impedance. These features are achieved by having a high gain amplifier with a large amount of negative feed back following the integrating stage.

The level of the output of the integrating amplifier may be adjusted to equal that supplied by the active filter to the synchro resolver direct and by virtue of the integration lags that output by 90° in time phase.

The resistors included in output from the active filter and the integrating amplifier serve to provide a current feed to the resolver thereby ensuring that the impedance and consequently the phase relationships within the resolver are sensibly constant with changes in temperature.

When the levels of the inputs to the resolver are adjusted to equality a circular field rotating at the supply frequency is induced in the iron circuit of the stator and the voltage induced in the rotor winding is an accurate measure of the angular displacement of the rotor with respect to the stator.

A resolver fed as described above has many applications in the field of phase measurement and kindred arts as a high accuracy phase shifter with a high temperature stability.

The invention will be further described with reference to the accompanying drawing which is a diagrammatic circuit of the synchro resolver and its supply arrangements.

As shown, square wave pulses are fed from a generator G to an active bandpass filter ABF the output of which is branched to supply firstly a resistance R1 connected to one winding W1 of the stator of synchro resolver SR and second an integrating amplifier IA the output of which is fed over resistance R2 to the quadrature winding W2 of synchro resolver SR.

The output of the resolver is taken from winding W3 on the rotor of the synchro resolver.

Since the resolver output is now sinusoidal it can be fed directly to following squaring circuit, e.g., of an analogue/digital converter. Thus successive stages of filtering, with their consequent loading of the resolver output are unnecessary.

Various modifications may be made in accordance with the invention.

I claim:
1. Means for generating a sinusoidal supply the phase of which varies according to a mechanical displacement comprising a synchro resolver having a pair of stator windings and a rotor winding, a single phase square wave generator, an active bandpass filter fed from the generator, a resistance connection for the active bandpass filter to one winding of the stator of the synchro resolver, an integrating amplifier fed from the active bandpass filter and a resistance connection from the integrating amplifier to the other winding of the stator of the synchro resolver.

References Cited

UNITED STATES PATENTS

| | | | |
|---|---|---|---|
| 2,422,074 | 6/1947 | Bond | 318—207 |
| 2,740,935 | 4/1956 | Statsinger | 323—109 X |
| 2,769,969 | 11/1956 | Comstock | 323—113 X |
| 2,900,590 | 8/1959 | Spencer et al. | 318—162 X |
| 2,976,467 | 3/1961 | McCoy | 318—30 |

LEE T. HIX, *Primary Examiner.*

A. D. PELLINEN, *Assistant Examiner.*

U.S. Cl. X.R.
318—30, 207